United States Patent [19]

Inman et al.

[11] Patent Number: 4,706,788
[45] Date of Patent: Nov. 17, 1987

[54] VIBRATION DAMPED APPARATUS

[75] Inventors: Scott Inman; Mitchell K. Enright, both of Santa Ana, Calif.

[73] Assignee: Melles Griot, Irvine Company, Irvine, Calif.

[21] Appl. No.: 723,546

[22] Filed: Apr. 15, 1985

[51] Int. Cl.[4] ............... F16F 7/10; F16F 1/14; F16F 9/30; F16M 13/00
[52] U.S. Cl. .................. 188/378; 188/268; 248/562; 248/636; 267/279
[58] Field of Search ............... 188/378–381, 188/268, 322.5, 371, 372; 267/140.1, 153, 148–149, 134, 136, 140, 140.4, 151, 57.1 R, 152, 57.1 A, 141, 154, 147, 157; 248/638, 636, 562, 559, 297.2; 74/574; 408/143; 52/720; 293/136

[56] References Cited

U.S. PATENT DOCUMENTS

| | | | |
|---|---|---|---|
| 1,041,264 | 10/1912 | Freud | 248/297.2 X |
| 2,469,167 | 5/1949 | Little | 188/268 X |
| 2,715,951 | 8/1955 | Lieber | 188/378 |
| 2,732,040 | 1/1956 | Vost et al. | 188/268 |
| 2,960,189 | 11/1960 | Osburn . | |
| 3,031,046 | 4/1962 | Hoadley | 188/268 X |
| 3,075,406 | 1/1963 | Butler, Jr. et al. . | |
| 3,107,752 | 10/1963 | McLean . | |
| 3,373,633 | 3/1968 | Desmond et al. . | |
| 3,486,585 | 12/1969 | Richter et al. . | |
| 3,552,230 | 1/1971 | McLean . | |
| 3,559,512 | 2/1971 | Aggarwal . | |
| 3,610,609 | 10/1971 | Sobel | 267/140 |
| 3,656,818 | 4/1972 | Bischoff et al. | 188/268 X |
| 3,690,414 | 9/1972 | Aggarwal et al. . | |
| 3,754,746 | 8/1973 | Thiele | 267/151 |
| 3,774,730 | 11/1973 | Maddux . | |
| 3,918,530 | 11/1975 | Nyholm | 188/268 X |
| 3,923,414 | 12/1975 | Hopkins | 188/378 X |
| 4,050,665 | 9/1977 | Matthews et al. | 248/638 |
| 4,350,233 | 9/1982 | Buckley | 188/378 |
| 4,470,121 | 9/1984 | Ebert | 188/322.5 X |

FOREIGN PATENT DOCUMENTS 2606479  8/1976  Fed. Rep. of Germany ...... 188/378

OTHER PUBLICATIONS

"Vibration and Shock in Damped Mechanical Systems", J. C. Snowdon, Wiley, New York, 1968, pp. 7–20.

"Shock and Vibration Handbook", Harris and Crede, McGraw Hill, New York, 1961, 2d Ed., p. 35–12.

Primary Examiner—Duane A. Reger
Assistant Examiner—Robert J. Oberleitner
Attorney, Agent, or Firm—Knobbe, Martens, Olson & Bear

[57] ABSTRACT

A vibration damped apparatus comprising a damping mass which is mechanically coupled to a member subject to vibration. The damping mass is formed from a elastic material throughout which a plurality of sub-masses are distributed. The sub-masses are relatively positioned so that the damping mass has different moduli of elasticity in tension and compression, so as to quickly dampen a broad frequency range of vibrations in the vibrating member. In a preferred embodiment, the vibrating member is a tubular post upon which vibration-sensitive optical components are mounted, the damping mass being disposed within a cavity in the post to damp vibrations of the post and optical components thereon.

34 Claims, 8 Drawing Figures

VIBRATION DAMPED APPARATUS

BACKGROUND OF THE INVENTION

This invention relates generally to an apparatus in which mechanical vibrations are damped, and more particularly to an apparatus comprising a member subject to vibration, and a damping mass which is mechanically coupled thereto. In the preferred embodiment, the present invention is utilized as a means to damp the vibration of a mounting post on which vibration-sensitive optical equipment is secured.

Generally, to withstand the added dynamic stresses that result from vibration, a vibrating member must be strengthened structurally, which increases the cost and weight of the member's design. To reduce the need for structural strengthening, vibration damping mechanisms are commonly utilized to minimize the amplitude and acceleration of a member's vibration. Such damping mechanisms are used in mechanical structures of virtually all types to reduce the various adverse effects of vibratory motion. Vibration is particularly undesirable in high precision devices such as mounting posts for optical equipment, where the amplitude of the displacement of the member due to vibration is significant in terms of the degree of precision sought to be achieved.

Optical equipment mounting posts are typically designed so that a number of posts can be rigidly secured by their bases to a common surface, allowing various optical instruments to be secured to the posts and spatially aligned to perform various optical techniques. For example, a pair of posts may be mounted on a tabletop, one post having a light source such as a laser secured to it by means of an adjustable collar, with the other post similarly having a mirror secured to it. The relative positions of the posts and the optical components secured thereon may be adjusted so that the light source strikes the mirror and is reflected to a precisely determined destination. However, since the mounting posts and the attached optical instruments behave as a single rigid body, any vibration of the posts will cause the optical instrument to vibrate as well. In the above example, if the post on which the mirror is secured begins to oscillate relative to the light source, due to vibration, the reflected light beam will also oscillate, undesirably diminishing the degree of precision to which the destination of the reflected light beam can be maintained.

Even in a laboratory environment, a mounting post and its related optical equipment are difficult to isolate from various ambient disturbances which may vibrationally excite the post and cause it to resonate. Examples of typical ambient disturbances include loud noises such as those caused by passing aircraft, ground vibrations caused by the passing of large motor vehicles or by the operation of construction equipment, or even the vibrations of transformers within electrical devices utilized in the laboratory.

Since even the most rigid mounting posts will, at their respective resonant frequencies, be subject to vibration of an amplitude significant enough to effect the desired precision of the optical components, previous mounting posts have been designed with an internally disposed damping apparatus. In Matthews, et al. (U.S. Pat. No. 4,050,665) a rigid, tubular mounting post is disclosed in which at least two dynamically damped masses are disposed. The damping masses are serially aligned along the longitudinal axis of the post, and each mass is spaced from the adjacent masses and the interior wall surface of the post only by a resilient washer. Damping systems with serially-aligned masses are also disclosed in Osburn (U.S. Pat. No. 2,960,189), Aggarwal (U.S. Pat. No. 3,559,512) and Aggarwal, et al. (U.S. Pat. No. 3,690,414).

Each mass in the damped mounted post shown in Matthews comprises a unique damping system, with its own resonance characteristics. The resonance characteristics of these damping systems are mainly a function of the weight and location of the mass, the damping and spring constants of the washer material, and the size of the washers. Each damping system is selected so that its unique resonance characteristics will be optimally "tuned" to a particular vibrational frequency of the post. When the damping system is "tuned", the mass resonates out of phase with the post, and thus absorbs the vibrational energy of the post. When a plurality of tuned damping systems are employed, a preferred pattern of vibrational frequencies of the posts can be damped, resulting in effectively broadening the damping characteristics of the overall system.

While the Matthews device provides adequate damping at certain frequencies, its performance is less than satisfactory at the first order or fundamental resonant frequency of the post. As is well known, for a given amount of excitation force, the post's vibrations will be the largest when the excitation force is at a resonant frequency, for example at the cantilever mode of the post. The cantilever mode refers to the fundamental resonant frequency of the post with one end of the post rigidly secured to a surface, as the post is arranged in operation. Moreover, in most optical equipment applications, the majority of harmful ambient vibratory excitation forces are at low-frequencies which tend to excite the lower frequency resonant modes of the post, such as the fundamental mode. Thus, the lowest resonant frequencies of the post are subject to the greatest amount of excitation force, causing the amplitude of the vibrations at these resonant frequencies to be much higher than at other frequencies. Therefore, it is particularly important to damp vibrations at these lower resonant frequencies.

Accordingly, a need exists for a broadband vibration damped apparatus which is particularly effective in damping resonant frequency vibrations which are caused by low-frequency ambient excitations.

SUMMARY OF THE INVENTION

The present invention comprises a damping mass which is mechanically coupled to damp the oscillations of a member having a natural resonant frequency about an axis of oscillatory movement when exposed to an excitation force. The damping mass is comprised of a plurality of sub-masses which are distributed in a material, preferably an elastic material, such that at least a majority of the sub-masses in the elastic material are spaced from the axis of oscillatory movement. The combined weight of the plurality of sub-masses exceeds the weight of the volume of elastic material through which the sub-masses are distributed. Moreover, in the preferred embodiment, the total volume of the sub-masses is substantially greater than the volume of the elastic material through which the sub-masses are distributed. Preferably, the sub-masses are sufficiently small and closely spaced such that the damping mass cross-sectionally exhibits plural sub-masses in each of the three mutually orthogonal intersecting planes which pass through the damping mass at the point of mutual intersection. Such distribution of the sub-masses in the elastic material is preferably selected to cause the damping mass to have a non-linear modulus of elasticity which is significantly higher in compression than in tension and to have a shear modulus which is significantly higher when the damping mass is in compression than when the damping mass is in tension. The non-linear characteristics of the modulus of elasticity causes the neutral axis of the damping mass to shift from one side of the axis of oscillatory movement to another side during the oscillation of the member.

The sub-masses are preferably spaced in close proximity to each other so that at least a substantial portion of the masses spatially interfere with each other during the oscillation of the member. In the preferred embodiment, the damping mass is formed of a mixture of sub-masses and elastic material, such that the sub-masses are substantially uniformly distributed through the elastic material. the sub-masses are each coated with the elastic material but are distributed in close proximity such that the sub-masses are closer to each other than the diameter of the sub-masses to cause the sub-masses to be substantially touching each other during oscillation of the vibrating member. By way of example, the sub-masses may be spherical and formed of lead. The elastic material preferably comprises a viscoelastic material having a shear modulus which varies nonlinearly throughout a range of frequencies.

Preferably, the damping mass of the present invention is disposed within a cavity, formed in the member, and the damping mass substantially fills the cavity. In the disclosed embodiment, the damping mass comprises a single unitary damping mass.

Although the damping mass utilized in the present invention is widely applicable to various damping applications, the particular application disclosed in the preferred embodiment relates to a damped mounting post for mounting optical instruments. The post is formed as a tubular elongate member, and the damping mass is disposed within the tube. The damping mass is mechanically coupled to the post by forming the damping mass to have a shape which matches the shape of the interior surface of the tube so as to fit tightly therein. The preferred embodiment utilizes a tube having a D-shaped cross section which provides an increased wall thickness portion on one side of the tube. A slot is formed in this increased wall thickness wall portion to provide a means for mounting optical instruments. In the disclosed embodiment, the slot is T-shaped.

The present invention also encompasses a method of manufacturing a damping mass for a member which exhibits oscillations at a natural resonant frequency upon exposure to an excitation force. The method comprises homogenously distributing plural sub-masses throughout at least a portion of an elastic material to form an agglomeration such that said sub-masses are closer to one another than diameter of said sub-masses.

The invention also includes a method of manufacturing a damping mass for mechanically damping the vibration of the vibrating member. This method comprises the steps of combining a liquid elastic material and a plurality of sub-masses so as to coat each sub-mass with the elastic material. The proportions of the liquid elastic material and the sub-masses are selected such that the sub-masses agglomerate in the liquid. Th elastic material is then solidified to form a solid damping mass with the sub-masses distributed throughout the elastic material.

In accordance with a further aspect of the invention, a method of coupling a damping mass to a member for damping vibrations in the member comprises the steps of forming a fluid mixture of solid sub-masses in a liquid, introducing the fluid mixture into a cavity in the vibrating member, and solidifying the mixture. In the preferred method, the sub-masses have a weight sufficient to cause the sub-masses to settle in the liquid such that some of the sub-masses are supported by other of the sub-masses during the solidifying step.

DETAILED DESCRIPTION OF THE PREFERRED EMBODIMENT

Figures 1, 2, 2A, 4A, 4B, 5:
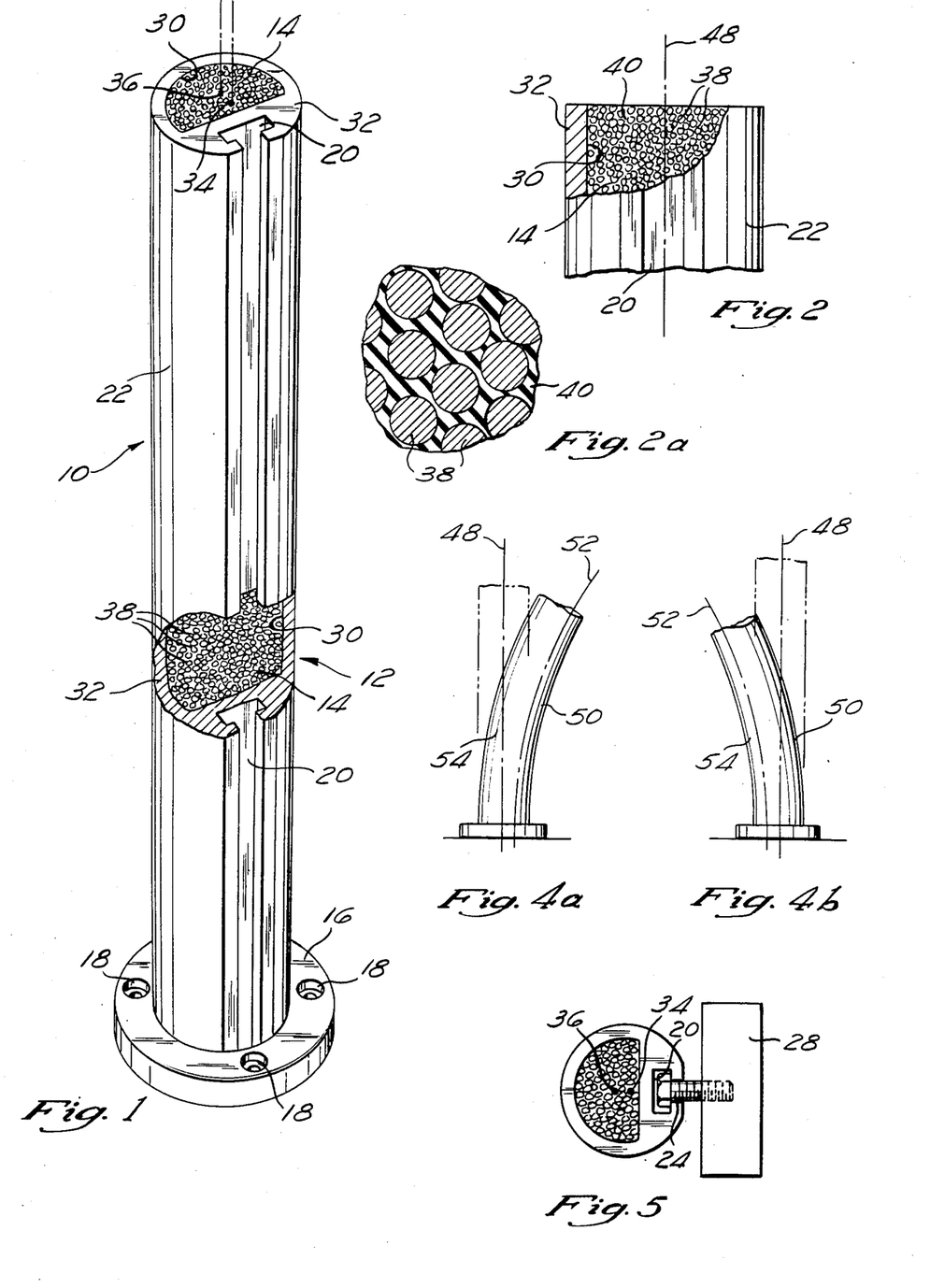
FIG. 1 is a perspective view of a preferred embodiment of the invention, illustrating a tubular optical equipment mounting post in which a portion of the tubular post has been cut away to expose the damping mass.
FIG. 2 is a partial elevation view of the post in FIG. 1 in which the post is partially broken away to expose the damping mass.
FIG. 2a is a fragmentary view, in cross section, showing the submasses and the elastic material of the damping mass.
FIGS. 4a and 4b are schematic representations of the post in FIG. 1 as it oscillates in the fundamental resonant mode.
FIG. 5 is a plan view of the post in FIG. 1 with an optical component secured to the post.

As illustrated in FIG. 1, a preferred embodiment of the invention comprises an elongated tubular mounting post 10, having an interior cavity 12 in which a damping mass 14 is disposed. The post 10 is rigidly secured to a base 16 which comprises an annular plate having a plurality of bores 18 which allow the post 10 to be affixed to a surface by means of bolts (not shown).

The post 10 has an interior surface 30 which is spaced from the exterior surface 22 by a wall 32. The interior surface 30 is substantially D-shaped in a plane normal to the longitudinal axis of the post, as shown in FIG. 1, and defines the cavity 12, which, in the preferred embodiment, extends throughout the entire axial length of the post. The D-shaped cross section of the interior surface 30 provides an increased thickness of the wall 32 on one side of the post to accommodate a T-shaped slot 20, which is formed in the increased wall thickness portion and extends longitudinally along the entire axial length of the post 10.

The post 10 has a central longitudinal axis 34 passing through the geometrical center of its cross sectional area which will be referred to as the central post axis 34. Similarly, the damping mass 14 in the cavity 12 has a central longitudinal axis 36 passing through the geometrical center of its cross sectional area which will be referred to as the central mass axis 36. Due to the non-uniform thickness of the wall 32, the central post axis 34 is not coincident with the central mass axis 36 of the damping mass 14.

The damping mass 14 is disposed along the entire length of the cavity 12 and fills the cavity 12 in the preferred embodiment. Although the post of FIG. 1 has a D-shaped cavity, it will be understood that the shape of the cavity 12 may be varied to suit various applications. However, the damping mass 14, which is disposed in the cavity 12, must be mechanically coupled to the post 10 such that the vibratory energy of the post is transferred to the damping mass. As illustrated in the preferred embodiment, the damping mass 14 is sized so that the external contour of the damping mass 14 is is contiguous with the D-shaped interior surface 30 of the post 10, thereby causing the damping mass 14 and post 10 to mechanically couple through intimate surface contact.

As shown in FIGS. 2 and 2a, the damping mass 14 is comprised of an agglomeration of small sub-masses 38 within a resilient material, such as an elastic material 40. The sub-masses 38 are discrete granules which are macroscopic in size and are substantially more rigid than the elastic material 40, and, for example, may comprise metal balls. The elastic material 40 used in the preferred embodiment comprises a material which exhibits "viscoelastic" properties. As is well known, a viscoelastic material is an elastic material in which the deformation or strain of the material temporarily lags behind the stress applied, thus behaving like a spring coupled with a viscous damper. A viscoelastic material also will have a shear modulus which is a function of the frequency of the loading over a certain range of frequencies.

A preferred elastic material 40 for use with the post 10 is plastisol, which is a plasticized polyvinyl chloride substance having viscoelastic properties, available from Diversified Compounders, City of Industry, Calif. By way of example, the sub-masses 38 are each comprised of a single pellet of No. 9 lead shot, the pellets being spheres with 0.080 inch diameters. Although the No. 9 lead shot was utilized in the embodiment disclosed, the invention has also been tested in two alternative preferred embodiments utilizing No. 00 lead shot and steel BB's, respectively. Both of these alternative embodiments yielded good results. Regardless of the size of the sub-masses used, it is believed that the sub-masses 38 should have a reasonably high density compared to the density of the elastic material, and should specifically have a density of at least on the order of 5-10 times the density of the elastic material so as to cause the sub-masses to "work" with elastic material during oscillation of the vibrating member. By way of example, the lead shot has a density of about 0.40 pounds per cubic inch which is about 11 times the 0.035 pounds per cubic inch density of the plastisol material. The steel BB's have a density of about 0.30 pounds per cubic inch which is on the order of about 8 times the density of the plastisol material.

The post 10 of the embodiment disclosed is fabricated from extruded aluminum. The T-shaped longitudinal slot 20 which is formed in the post's tubular wall opens to the exterior surface 22 of the post. In operation, the post 10 is rigidly secured to a surface such as a tabletop by means of fasteners which pass through the bores 18. As shown in FIG. 5, the T-shaped slot 20 facilitates the clamping of optical instruments onto the post. The slot 20 is sized to receive square-head a bolt 24 such that the bolt head slides within the T slot 20. The desired optical component 28 is mounted on the bolt 24 and the optical component 28 is adjusted so as to be aligned and in proper position for whatever optical techniques are to be performed. Since the T slot 20 runs along the entire axial length of the post 10, the bolt 24 within the T slot and the equipment mounting collar 26 can be moved vertically along the post to change the position of the optical equipment 28. Although not illustrated, it will be apparent to those skilled in the art that optical components can be fastened to the post by alternate means. For example, a split ring collar may be clamped around the post, and an optical component secured to the collar, without the use of bolt 24. Alternatively, a gear track may be inserted within the T-slot 20 so that a collar with a mating gear can be raised or lowered along the post 10 by rotating the gear.

While in use, the post 10 is subject to various ambient excitation forces which may cause it to resonate. The majority of these ambient disturbances are typically at low frequencies, so the cantilever mode and first bending mode of the post are subject to the greatest amount of excitation force and therefor have a greater amplitude of vibration than the higher order modes of the post. Since the spatial stability of the optical components secured to the post decreases as the amplitude of the vibrations increases, it is important to quickly damp out the low frequency vibrations of the post in order to insure sufficient stability for sophisticated, high-precision optical techniques.

Figure 3:
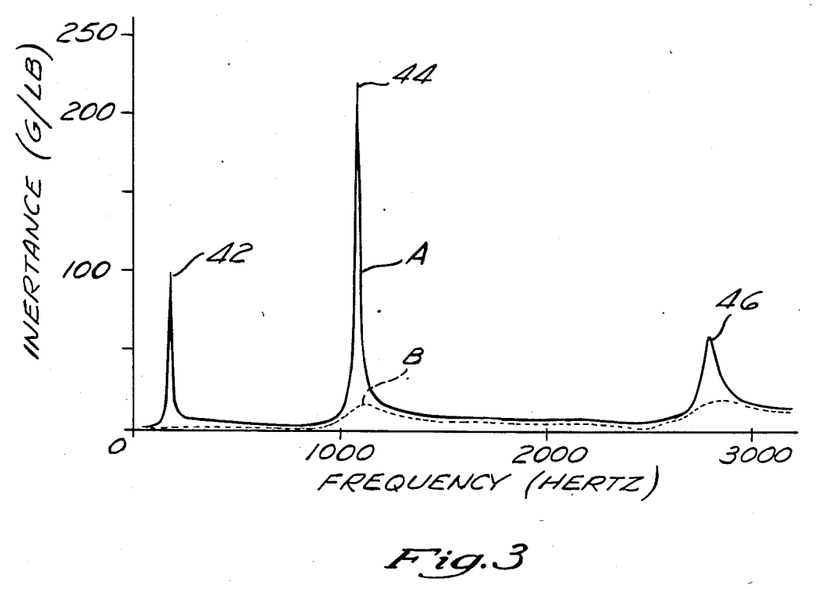
FIG. 3 is a graph of inertance versus vibration frequency for the post of FIG. 1, both with and without the damping mass inside the post.

The effectiveness of the damping mass 14 in damping the fundamental or cantilever mode of the post has been demonstrated in laboratory testing. The results of these tests are illustrated in FIG. 3, which is a graph showing the vibration damping characteristics of the aluminum post 10 (A) without any damping mass 14 (i.e., cavity 12 empty), and (B) with a mass 14 comprised of a mixture of plastisol and No. 9 lead shot. The graph is a plot of inertance, or the acceleration of the post for a unit excitation force, measured in G/lb (G being the force of gravity), on the vertical axis, versus the frequency of the vibration in hertz, on the horizontal axis. The acceleration component of inertance is inversely proportional to damping, thus the smaller the value of inertance, the better the damping. Curve A represents the post 10 with the cavity 12 empty, and curve B represents the post 10 with the damping mass 14 in place, within the cavity 12. The undamped post of curve A exhibits a first peak 42 which corresponds to the vibrations at the fundamental resonant frequency of the post. In contrast, the damped post of curve B shows an inertance at that same frequency which is two orders of magnitude smaller than that of the undamped post, illustrating the effectiveness of the damping mass 14 in damping the vibration of the post. Second and third peaks 44 and 46 correspond to the higher order resonant modes of the post, which are also significantly damped by the damping mass, as shown by curve B. Note that the resonances appear to occur at the same frequency for curve B as for curve A.

Although the theory underlying the present invention is not completely understood, it is believed that several coincident phenomena contribute to the superior damping characteristics displayed by the post 10 and damping mass 14. In general, these phenomena relate to the unique overall material characteristics and properties of the damping mass 14, which are quite different than the individual material properties of its component parts (i.e., the elastic material and the sub-masses). For example, the damping mass 14 has a modulus of elasticity, or ratio of stress over strain, which is extremely non-linear. That is, the modulus of elasticity of the damping mass 14 is variable, and is much greater in compression than it is in tension. In the preferred embodiment, the change in modulus of elasticity is believed to occur abruptly at the point where the loading changes from tensile to compressive. Significantly, tensile and compressive loading on the damping mass 14 also effect the shear modulus, which is the ratio of the shearing stress and shearing strain. The shear modulus is substantially greater when the damping mass 14 is being compressed than when it is in tension. Since the amount of deformation of a body in torsion for a given amount of force is a function of the shear modulus, the force required for a given torsional deformation of the damping mass is similarly greater during compressive loading than during tensile loading.

The non-linear shear and elastic moduli are believed to be caused by the "spatial interference" of the sub-masses 38 upon compression of the damping mass 14. The sub-masses 38 are distributed closely enough throughout the elastic material 40 so that upon compressive deformation of the damping mass 14, the sub-masses 38 will be displaced, thus reducing the space between the sub-masses, and causing them to spatially interfere, either through direct contact with each other or by means of indirect contact with each other through the deformed elastic material 40 dispersed between the sub-masses 38. Preferably, the sub-masses 38 are so closely packed that the space between adjacent sub-masses which is filled with elastic material 40 does not exceed the diameter of a sub-mass 38. In tension, the sub-masses 38 are pulled apart, such that there is no significant spatial interference, resulting in the load being carried mainly by the elastic material 40, which deforms more easily than the sub-masses.

Due to the spatial interference of the sub-masses 38, a load which deforms the damping mass 14 will cause the sub-masses 38 to interact in a variety of energy dissipating fashions. First, the elastic material 40 dispersed between the sub-masses 38 will transfer kinetic energy to thermal energy as the sub-masses move and the elastic material is deformed. Secondly, the sub-masses 38 will directly interfere with each other's movement as they are displaced by the vibrational forces imparted through the post 10 to the damping mass 14. This spatial interference causes energy dissipation through Coulomb or dry friction damping as the sub-masses 38 contact each other, and also results in the elastic and inelastic deformation of the sub-masses 38, which further dissipates energy. The sub-masses 38 also spatially interfere indirectly as the elastic material 40 between the sub-masses 38 is compressed to such a degree that it acts as a rigid coupling between the sub-masses 38.

As energy is dissipated througout the damping mass 14 by these various phenomena, the vibrational kinetic energy of the post 10 is transferred to the damping mass 14 and dispersed therein, causing the post's vibration to be damped. The unique interaction of the sub-masses 38 and elastic material 40 which cause this high-speed energy dissipation is believed to be a result of the non-linear modulus of elasticity of the damping mass 14.

To ensure the effective operation of the damping mass 14 and utilization of these various energy dissipating phenomena, the sub-masses 38 should be distributed throughout the elastic material 40 in such a way that a portion of the damping mass 14 is alternatively placed under a tensile and a compressive load so as to be subject to the non-linear modulus of elasticity. This is achieved by spacing the sub-masses 38 from the axis about which the damping mass is oscillating. As shown in FIG. 2, the post 10 has an axis of motion 48 about which the post oscillates under all types of loading, whether tensile, compressive, torsional, bending or shear. The sub-masses 38 are distributed homogenously throughout the width of the damping mass 40 so that the centers of the majority of sub-masses 38 are spaced from that axis 48. Thus, any portion of the damping mass 14 which is subject to an alternating tensile and compressive load, such as during bending, will have a non-linear modulus of elasticity.

Alternatively, the sub-masses 38, rather than being homogenously distributed, may be distributed throughout only a portion of the damping mass 14. However, it is believed that the sub-masses closest to the interior surface 30 do the most work, and thus it appears that the greater the concentration of sub-masses 38 towards the interior surface 30 of the post, the better the damping will be, since the vibrational motion of the post can be more quickly transferred directly to the sub-masses, the displacement of which will dissipate the vibrations.

Figure 6:
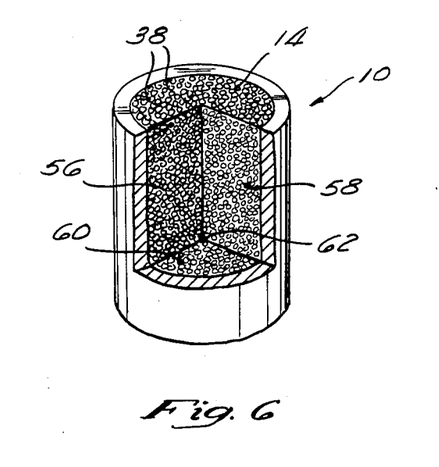
FIG. 6 is a perspective view of a portion of the post in FIG. 1, with the portion of the post and damping mass cut away along three mutually intersecting orthogonal planes to cross sectionally expose the sub-masses in each of the planes.

As shown in FIG. 6, the sub-masses 38 are small enough in relation to the volume of the cavity 12 and closely packed so that there are a plurality of sub-masses in each of three mutually orthogonal cross sectional planes 56, 58, and 60 which intersect at a point 62 within the damping mass.

Due to the non-linear modulus of elasticity of the damping mass, the neutral axis of the damping mass does not necessarily coincide with the axis of motion. The neutral axis is defined as the axis at which there is no loading in a body which is under stress. All elements on one side of the neutral axis are in compression, while all of those elements on the opposite side of the neutral axis are in tension. Typically, the location of the neutral axis within a body is stationary, and in symmetrical bodies, the neutral axis generally is coincident with the centroidal axis. However, the neutral axis of the damping mass will shift from one side of the axis of vibratory motion to the other side.

FIGS. 4a–b illustrate the cantilever mode of the post 10. When the post is bending to the right, as in FIG. 4a, the right side portion 50 of the damping mass 14 is in compression. However, since the modulus of elasticity for the damping mass is greater in compression, only a relatively small portion of the damping mass is in compression compared to the amount of the damping mass which is in tension. This is illustrated by the location of the neutral axis 52, which is to the right of the axis of vibratory motion 48.

FIG. 4b shows the post at the other extreme of its cantilever mode oscillation, when it is bent to the left. Now, the left side portion 54 of the damping mass is compressed, and the right side portion 50 is in tension. As a result, the neutral axis 52 has shifted to the left side of the axis of vibratory motion 48.

In general, the present invention is believed to be unlike a tuned damper in that its damping characteristics do not appear to be frequency sensitive. In a tuned damper, the size and location of the dynamic masses are chosen so they will oscillate out of phase with a vibrating member at a certain frequency. However, tests of the present invention do not evidence such frequency sensitive behavior. Thus, it appears that the damping mass 14 yields more effective damping over a broader range of frequencies than a tuned damper.

To fabricate the damping mass 14 of the preferred embodiment, the proper ratio of elastic material 40 to sub-masses 38 is first determined. The ratio is selected so that the interstices between the sub-masses are all filled with the elastic material 40. By way of example, the volume of sub-masses 38 used is approximately that amount which will fill the cavity 12, without any elastic material 40.

Knowing the volume of each sub-mass 38, the density of the sub-masses 38, the volume of the cavity 12 and the weight of the amount of sub-masses which fill the cavity 12 without elastic material 40, the total volume of the interstitial spaces can be determined. This interstitial volume, as calculated, will be the volume of elastic material 40 that is combined with the sub-masses 38 to form the damping mass 14.

In one preferred embodiment, the post 10 is 400 millimeters in length, the cavity 12 has a cross-sectional area of 0.763 square inches, a length of 15 inches and a volume of approximately 11.5 cubic inches. In this embodiment, the sub-masses 38 are No. 9 lead shot having density of 0.4 pounds per cubic inch, and a volume of 0.000268 cubic inches per pellet based on a 0.080 inch diameter spherical shape. The cavity 12 is completely filled with approximately 2.8 pounds of shot, or roughly 26 thousand pellets, which occupy about 7 cubic inches of space within the cavity 12, excluding the interstitial space between the sub-masses. Thus, roughly 4.5 cubic inches of elastic material 40 is required to fill the interstices between sub-masses 38. The volume of sub-mass material 38 (e.g., 7 cubic inches) is thus significantly greater than the volume of elastic material 40 (e.g., 4.5 cubic inches) used to form the damping mass 14. Likewise, the weight of the sub-masses 38 is also significantly greater than the weight of the elastic material 40, since the density of the sub-masses 38 is significantly higher than that of the elastic material 40 in the preferred embodiment.

The selected volume of sub-masses 38 and elastic material 40 are then combined. Preferably, the elastic material 40 is a thermosetting polymer which is liquid at room temperature, such as plastisol. The lead shot and liquid plastisol are then agitated to form a mixture in which the shot is homogenously distributed through the liquid, so that each pellet is coated with plastisol. The agitated mixture is poured into the cavity 12 and then heated until the plastisol sets, agglomerating the sub-masses 38 within the solid damping mass 14. As opposed to being held in suspension within the liquid elastic material 40, the sub-masses 38 preferably are so closely packed and rigid enough so that the sub-mass 38 are self-supporting while the elastic material 40 sets. Since the liquid mixture conforms to the shape of the cavity, the damping mass 14 formed will be mechanically coupled to the post 10.

It is to be understood that the damping mass of the present invention may also be coupled to damp various types of vibrating members other than mounting posts, and thus the invention is useful for a broad range of vibration damping applications other than the illustrated optical mounting post.

What is claimed is:

1. A mechanically damped apparatus, comprising
a member; and
a damping mass, mechanically coupled to said member for damping oscillation of said member, said damping mass comprising:
a volume of elastic material; and
a plurality of submasses, distributed in said volume of elastic material such that (i) said damping mass exhibits plural submasses in each of three mutually orthogonal intersecting planes and (ii) plural ones of said submasses are in close proximity to other submasses so as to interfere with each other upon compression of said damping mass, the volume of the interfering submasses greater than the volume of elastic material filling intersticies between the interfering submasses, said elastic material being comprised of a material which is more easily deformed than said submasses by said oscillations.

2. A mechanically damped apparatus, as defined by claim 1, wherein said member has an axis of oscillatory movement, and wherein a portion of said damping mass is spaced from said axis such that said damping mass is alternatively in compression and tension during said oscillations, said distribution of said submasses in said elastic material causing said damping mass to have a modulus of elasticity which abruptly changes between tension and compression, said modulus being significantly higher in compression than in tension.

3. A mechanically damped apparatus, as defined by claim 2, wherein said damping mass has a shear modulus which abruptly changes as said damping mass moves between tension and compression, said shear modulus significantly higher when the damping mass is in compression than when the damping mass is in tension.

4. A mechanically damped apparatus, as defined by claim 2, wherein said damping mass has a neutral axis during said oscillation, said neutral axis shifting from one side of said axis of oscillatory movement to another side during said oscillation.

5. A mechanically damped apparatus, as defined by claim 1, wherein said damping mass comprises a mixture of said submasses and said elastic material, such that said submasses are substantially uniformly distributed through said volume of elastic material.

6. A mechanically damped apparatus, as defined by claim 1, wherein said submasses are spherical.

7. A mechanically damped apparatus, as defined by claim 1, wherein said submasses are formed of lead.

8. A mechanically damped apparatus, as defined by claim 1, wherein said elastic material comprises a viscoelastic material.

9. A mechanically damped apparatus, as defined by claim 1, wherein said member is elongate.

10. A mechanically damped apparatus, as defined by claim 9, wherein said elongate member comprises a tube and said damping mass is disposed within said tube.

11. A mechanically damped apparatus, as defined by claim 10, wherein the shape of said damping mass matches the shape of the interior surface of said tube so as to fit tightly therein.

12. A mechanically damped apparatus, as defined by claim 11, wherein the interior surface of said tube is D-shaped in crosssection to provide an increased wall thickness portion of said tube, and said elongate tube includes a slot formed in said increased wall thickness position.

13. A mechanically damped apparatus, as defined by claim 1, wherein said damping mass is disposed within a cavity formed in said member, and said damping mass substantially fills said cavity.

14. A mechanically damped apparatus, as defined by claim 1, wherein said damping mass comprises a single unitary damping mass.

15. A mechanically damped apparatus, as defined by claim 1, wherein the combined weight of the plurality of submasses exceeds the weight of the volume of elastic material through which said submasses are distributed.

16. A mechanically damped apparatus as defined by claim 1, wherein said submasses have a density on the order of at least 5-10 times that of the elastic material.

17. A damping mass for damping mechanical oscillations in a mechanical member, comprising:
an elastic material; and
an agglomeration of submasses distributed in said elastic material, said submasses being formed of a material which deforms less easily than said elastic material, the relative proportions of said submasses and elastic material selected such that the total volume of said submasses in said elastic material is greater than the volume of elastic material in which said submasses agglomerate, so that said submasses are disposed in close proximity to cause some of said submasses to spatially interfere with other of said submasses during compression of said damping mass.

18. A damping mass, as defined in claim 17, wherein said elastic material has viscoelastic properties.

19. In a mechanically damped apparatus comprising a member which exhibits oscillations upon exposure to an excitation force, the improvement comprising:
a damping mass having a modulus of elasticity in compression, a modulus of elasticity in tension, and a shear modulus, said damping mass comprising a plurality of submasses disposed in and retained by a material such that (1) the modulus of elasticity in compression is significantly higher than the modulus of elasticity in tension, and (2) said shear modulus is significantly higher when said damping mass is in compression than the shear modulus when said damping mass is in tension, said submasses being sufficiently small and closely spaced such that said damping mass cross-sectionally exhibits plural submasses in each of three orthogonal mutually intersecting planes which have a point of mutual intersection within said damping mass.

20. The apparatus of claim 19, wherein said material is relatively elastic compared to said submasses and said plurality of submasses is distributed in said material such that at least some of said submasses interfere with other of said submasses during compression of said damping mass.

21. The apparatus of claim 20, wherein said submasses agglomerate in said elastic material, said submasses have a density on the order of at least 5-10 times that of said elastic material, and said variations in modulus of elasticity and shear modulus are caused by spatial interference between the submasses.

22. A damping mass for damping mechanical oscillations in a mechanical member, comprising:
a volume of submasses disposed in a volume of elastic material such that said elastic material film interstices between said submasses, said elastic material comprised of a material which deforms more easily than said submasses, the volume of said submasses greater than the interstitial volume filled by the elastic material, said submasses sufficiently small and closely spaced such that said damping mass cross-sectionally exhibits plural submasses in each of three orthogonal mutually intersecting planes which have a point of mutual intersection within said damping mass.

23. A method of manufacturing a damping mass for a member which exhibits oscillations at a natural resonant frequency upon exposure to an excitation force, said method comprising:
homogeneously distributing plural submasses throughout at least a portion of the volume of an elastic material comprised of a material which is more easily deformable than the submasses to form an agglomeration such that said submasses in said portion of said volume (i) are in close proximity with said elastic material filling intersticies between said submasses, and (ii) have a combined volume which is greater than the volume of elastic material filling the intersticies.

24. A method of manufacturing a damping mass for mechanically damping the vibration of a vibrating member, comprising:
combining a liquid elastomer and a plurality of submasses so as to coat each submass with said elastomer;
selecting the proportion of said liquid elastomer and said submasses such that said submasses agglomerate in substantially touching relationship in said liquid; and
solidifying the elastomer to form a solid damping mass with the submasses substantially uniformly distributed throughout the elastomer.

25. A method of manufacturing a damping mass, as defined by claim 24, additionally comprising the step of introducing the combined liquid and submasses into a cavity in said member, the volume of submass material in said damping mass approximately equal to the material volume of submasses that will fill said cavity.

26. A method of manufacturing a damping mass, as defined by claim 24, additionally comprising the step of introducing the combined liquid and submasses into a cavity in said member, wherein the step of solidifying the elastomer is performed subsequent to said step of introducing the combined liquid and submasses into the cavity.

27. A method of manufacturing a damping mass, comprising:
coating a plurality of submasses with a liquid elastic material that is capable of solidification, and which when solidified is more easily deformable than said submasses;
solidifying said liquid elastic material to form a solid damping mass with said submasses in close proximity such that (i) said damping mass exhibits plural submasses in each of three mutually orthogonal intersecting planes, and (ii) at least a substantial portion of submasses are distributed in substantially touching relationship so as to cause interference between submasses upon compression of the damping mass.

28. A method of manufacturing a damping mass, as defined by claim 27, wherein said submasses have a weight sufficient to cause said submasses to settle in said liquid such that said submasses are supported by other of said submasses during said solidifying step.

29. A method of manufacturing a damping mass, as defined by claim 27, wherein said submasses are solid particles.

30. A method of manufacturing a damping mass for damping vibrations in a member, said method comprising:
introducing a plurality of submasses and a liquid elastic material into a cavity in a member such that said submasses are in substantially touching relationship, and said liquid elastic material fills interstices between said submasses;

solidifying said liquid elastic material to form a solid material to retain said submasses in substantially touching relationship, such that said submasses interfere with other submasses during said vibrations to damp said member; and selecting the submasses to have higher resistance to deformation than the solid elastic material.

31. A method of manufacturing a damping mass, as defined by claim 30, wherein said liquid elastic material exhibits a liquid state at room temperature.

32. A method of manufacturing a damping mass, as defined by claim 30, wherein said liquid material comprises a viscoelastic material.

33. A method of manufacturing a damping mass, as defined by claim 30, wherein said submasses are solid particles.

34. A damping mass, comprising:

a plurality of submasses distributed in a solid material which is flexible so as to deform upon compression of said damping mass, and which is more pliant than said submasses so as to deform more easily than said submasses upon compression of said damping mass, said submasses distributed in said volume of solid material such that (i) said damping mass exhibits plural submasses in each of three mutually orthogonal intersecting planes, and (ii) plural ones of said submasses are in substantially touching relationship so as to interfere with each other upon compression of said damping mass to provide damping.

* * * * *

UNITED STATES PATENT AND TRADEMARK OFFICE
CERTIFICATE OF CORRECTION

PATENT NO. : 4,706,788
DATED : November 17, 1987
INVENTOR(S) : Scott Inman and Mitchell K. Enright It is certified that error appears in the above-identified patent and that said Letters Patent are hereby corrected as shown below:

Column 11, line 58, Claim 22, change "elastic material film" to --elastic material fills--

Signed and Sealed this

Twenty-ninth Day of November, 1988

Attest:

DONALD J. QUIGG

*Attesting Officer*   *Commissioner of Patents and Trademarks*